Figure 1:
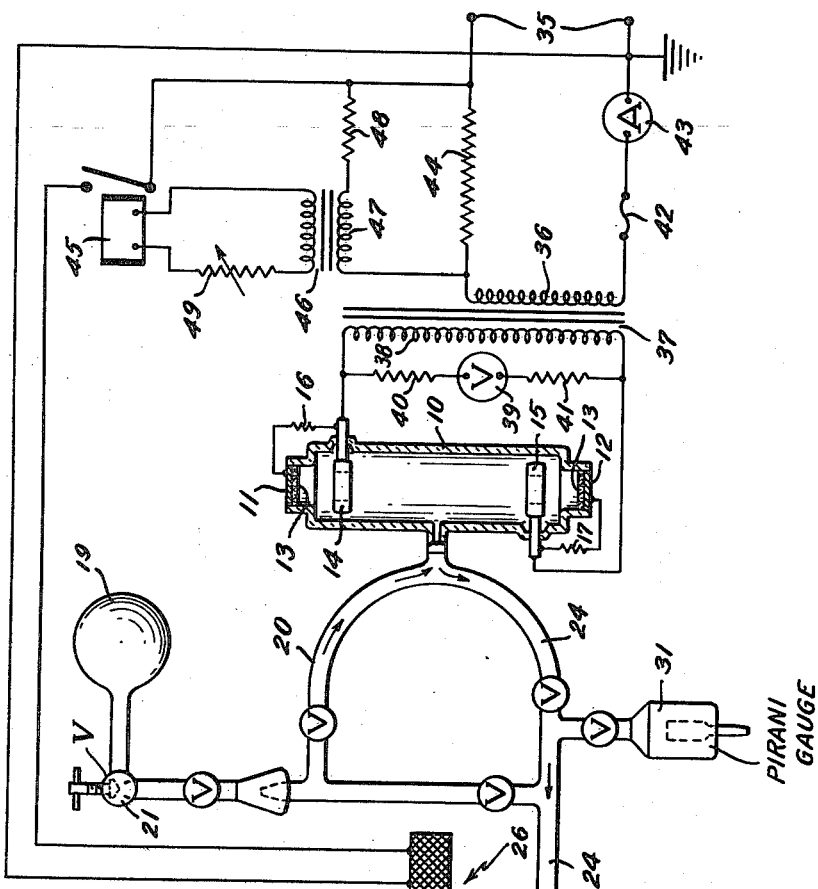

Dec. 13, 1960  J. M. BRINKERHOFF ET AL  2,964,665
PRESSURE CONTROL SYSTEM
Filed Dec. 1, 1955

Inventors;
Joris M. Brinkerhoff,
Sigmund P. Harris,
by Spencer E. Olsen
Att'y.

United States Patent Office 2,964,665
Patented Dec. 13, 1960

2,964,665

PRESSURE CONTROL SYSTEM

Joris M. Brinkerhoff, Arlington, and Sigmund P. Harris, Watertown, Mass., assignors to Tracerlab, Inc., Boston, Mass., a corporation of Massachusetts Filed Dec. 1, 1955, Ser. No. 550,330

1 Claim. (Cl. 313—61)

This invention relates generally to gaseous electric discharge devices and more particularly to means for controlling the gas pressure in such devices. More specifically, the invention is concerned with means for controlling the gas pressure in a neutron source of the electric discharge type.

In applications Serial No. 368,898, filed July 20, 1953, now U.S. Patent 2,926,271, issued February 23, 1960, and Serial No. 515,418, filed June 14, 1955, both entitled "Apparatus for Producing Neutrons" and assigned to same assignee as the present application, there are disclosed discharge-type neutron generators consisting essentially of an envelope confining at least one of the heavy isotopes of hydrogen and a pair of spaced electrodes disposed within the envelope. In the device of the earlier application a pair of planar electrodes were employed, and in the latter application, the electrodes are disclosed as being of ring shape so that ions and electrons produced in the discharge may pass therethrough. In both types, the pressure within the envelope is preferably maintained, relative to the spacing of the electrodes, such that the product $p \times d$ corresponds to a point to the left of the minimum breakdown potential of the curve associated with Paschen's law, whereby a very high voltage may be maintained between the electrodes. In the planar electrode device, upon application of a voltage of the order of 50–100 kilovolts to the electrodes, and the maintenance of this potential across the discharge, positive ions of the hydrogen isotope which are produced within the discharge are accelerated by the high voltage across the discharge into sufficiently high velocity collisions with neutral atoms of the hydrogen isotope which are present in the discharge, and adsorbed on the electrodes, to produce neutrons. In the device using ring-shaped electrodes, a target containing deuterium or tritium is disposed behind each of the electrodes, and when the device is energized from a high voltage alternating current source, positive ions of the heavy isotope of hydrogen produced in the discharge region are accelerated toward the instantaneously negative electrode, some of which pass through the opening in the electrode and strike the target behind that electrode to produce neutrons.

For optimum neutron production in either type of tube, it is necessary that the voltage across the electrodes be maintained as high as possible, since the neutron yield of the $D+D$ and $T+D$ reactions is a strong function of accelerating voltage. The voltage which can be maintained is, in turn, strongly dependent on the gas pressure in the envelope. If the gas pressure is too low, the discharge cannot be maintained at all, and if the pressure is too high, the current between the electrodes increases and the voltage drops to a level where few, if any, neutrons are produced.

It is an object of the present invention to provide a simple, positive acting, and sensitive control system for controlling the pressure of the gaseous atmosphere of a gaseous electric discharge device.

Another object of the invention is to provide such a control system which is useful in connection with gaseous electric discharge devices having a high vacuum in its envelope.

Still another object of the invention is to provide such a control system which is sensitive to small changes in the current in the discharge to control the pumping of gas from the envelope so as to maintain the pressure of the gas substantially constant at a value where maximum voltage is maintainable across the discharge.

A more specific object of the invention is to provide a control system for a high voltage gaseous electric discharge-type neutron generator which is sensitive to small changes in the current in the discharge to start and stop pumping of gas from the envelope of the device so as to maintain the pressure at a value where maximum voltage is maintainable across the discharge.

In accordance with the invention, the pressure of the deuterium or tritium in the discharge device is maintained at the proper value by slowly leaking the gas into the envelope of the device, and alternately pumping or not pumping on the envelope depending upon whether the current in the discharge is too high or too low, respectively. This is accomplished automatically by an electromagnetic valve, disposed in the pumping line, which is opened and closed in response to changes in the current drawn by the discharge device.

Figure 2:
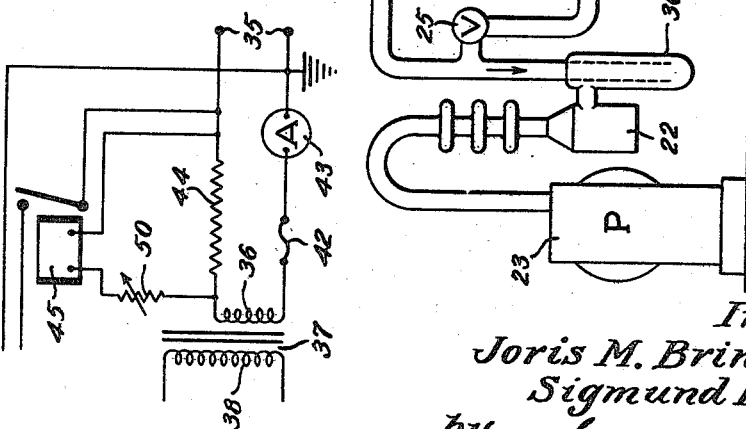

Other objects, features and advantages of the invention will become apparent from the following detailed description when considered with the accompanying drawings in which:

Fig. 1 is a partially schematic representation of a preferred form of the invention; and Fig. 2 is a circuit diagram of a modification of a portion of the system of Fig. 1.

Referring to the drawing, the gaseous electric discharge-type neutron generator consists of an elongated envelope 10 formed of glass or other material having good insulating properties and capable of withstanding reasonable temperatures and continued neutron bombardment. The envelope is closed at its ends by conducting cylindrical caps 11 and 12, the inside surfaces of which are coated with a target material 13 containing deuterium, such as deuterated paraffin or lithium deuteride. A pair of conducting ring-shaped electrodes 14 and 15 are sealed within envelope 10, intermediate the targets, and each electrode is connected to its corresponding end cap through a resistor, 16 and 17, to control the buildup of charge on the end caps. A full description of the discharge device will be found in the aforementioned copending application Serial No. 515,418, sufficient description having been given here to illustrate the operation of the present invention.

A gas reservoir 19 is connected to the envelope 10 by tube 20, the gas flow from the reservoir being controlled by a fine needle valve 21. The reservoir 19 contains tritium or deuterium, or a mixture of these two heavy isotopes of hydrogen, and under usual conditions of operation of the discharge device is continuously leaked into envelope 10 at the rate of about 1 cc. STP per hour, the exact rate depending to some extent on the rate of outgassing of the elements of the discharge device.

The pressure in the envelope 10 is maintained at a low value, nominally about 8 microns, by a diffusion pump, diagrammatically illustrated at 22, and a vacuum pump 23, which are connected by the line 24 to the envelope 10, at the same port into which gas is leaked from reservoir 19. For rough pumping, a hand-operated valve 25 in the line 24 is opened, and when the nominal desired pressure within the envelope is reached, valve 25 is closed, leaving the control of pumping on the envelope to electromagnetic valve 26. Valve 26 includes a plunger 27 containing ferromagnetic material, such as iron or iron rods, and the lower end is formed to engage a valve seat 28 to close the tube 14 when the valve is in the de-energized condition. The valve is surrounded by an electromagnetic coil 29, which upon energization, lifts the plunger from the valve seat, thus allowing the diffusion pump 22 to pump on tube 24 and envelope 10. A cold trap 30 between the diffusion pump 22 and valve 26, and a pressure gauge, such as a Pirani gauge 31, for indicating the pressure in line 24, and consequently within envelope 10, completes the vacuum system.

The discharge device is energized from a source of alternating current of suitable voltage and frequency, represented by terminals 35, a 60-cycle, 115-volt source having been found satisfactory. It will be understood that other frequencies may be used, 400 cycles, for example, which would reduce the physical size of transformers and the like. The supply voltage is applied to the primary winding 36 of a step-up transformer 37, the secondary 38 of which is connected across the electrodes 14 and 15 of the discharge device. It being desirable to maintain as high a voltage as practicable across the discharge between the electrodes, at least 60 kilovolts and preferably 100 kilovolts or more, the turns ratio of transformer 37 is preferably of the order of 1000:1. A voltmeter 39 and suitable resistors 40 and 41 are serially connected across the secondary 38 to indicate the voltage across the electrodes of the discharge tube, and a fuse 42 and meter 43 are serially connected in the primary circuit.

With the envelope pumped down to a suitable pressure, about 8 microns, the fine needle valve 21 is opened to allow deuterium and/or tritium to slowly leak into the envelope 10, and voltage is applied to transformer 37. With proper conditions existing, a discharge is developed between the electrodes 14 and 15, and if the voltage is adequate, neutrons will be generated. If the gas pressure is too low, a discharge cannot be maintained, and if it is too high, the current density in the discharge increases, dropping the voltage across the discharge to a value which is unproductive of neutrons with any degree of efficiency. It has been observed that the range of pressures between the condition where a discharge cannot be maintained and the condition where the voltage is too low to produce neutrons in any reasonable quantity is about 1.5 microns. Accordingly, it is necessary to provide means for controlling the pressure at the proper value within very close limits.

It has been found that the variation in current in the discharge is a very sensitive indicator of changes in pressure, and in accordance with this invention, such variations are utilized to control the pressure in the discharge tube. Variations in current in the tube, as reflected to the primary 36 of the transformer, cause corresponding variations in the voltage developed across resistor 44 connected in series with primary winding 36, and this voltage signal, in turn, is utilized to control the pumping on the discharge tube through line 24. In the embodiment of Fig. 1, the voltage signal is applied to the winding of a relay 45 via a step-up transformer 46, the primary 47 of which is connected in parallel with resistor 44, resistor 48 being included in series with the primary of the transformer to achieve a suitable division of currents in the parallel branches to provide an adequate voltage for operating the relay 45. Potentiometer 49 is provided in the secondary circuit to afford adjustment of the voltage at which the relay is to operate. It has been observed in the operation of the disclosed embodiment that the total current in the primary 36 is about 3 amperes. At this value of current the signal developed across resistor 44 is inadequate to cause relay 45 to pick-up, and accordingly electromagnetic valve 26 is closed. However, the parameters of the circuit are so selected that when the current in the primary circuit increases to about 3.5 amperes, indicating an increase in the pressure within the discharge tube, the voltage developed across resistor 44, after step-up in transformer 46, is sufficient to cause relay 45 to pick up thereby closing the energizing circuit of coil 29 to open the valve 26. It will be understood, of course, that the current values referred to are for purposes of illustration only, and that by suitable choice and adjustment of circuit parameters, other values of currents may be used to cause relay 45 to pick up and drop out. With valve 26 open, the vacuum pumps are connected to envelope 10 through line 24, and pump thereon, with gas continuing to leak into the envelope 10 from reservoir 19, until the pressure is again reduced to a value where the current is insufficient to maintain the relay 45 closed, at which time valve 26 is again closed and pumping on envelope 10 ceases. The diffusion of gas into the envelope 10 and in lines 20 and 24 is sufficiently rapid at the pressures involved that equilibrium is reached almost instantaneously upon cessation of pumping, and it is possible to maintain the pressure in the envelope within 1–2 microns of a desired nominal value. With care in the selection of circuit parameters, the system responds to very small changes in current, the action being positive, fast-acting, and automatic.

In the circuit of Fig. 1, the step-up transformer 46 is used to permit the use of a 115 volt relay, but it will be understood that other arrangements are possible without departing from the invention. For example, as shown in Fig. 2, the relay coil 45 may be connected directly across the series resistor 44, with a potentiometer 50 connected in series with the relay coil to adjust the point at which the relay picks up. In this case, as in Fig. 1, actuation of the relay 45, and the attendant opening of valve 26, is in response to current changes in the primary of the energization circuit of the discharge tube.

From the foregoing it is seen that applicants have provided a system for controlling the pressure in a gaseous electric discharge-type neutron generator which includes means for continuously admitting gas to the envelope at a slow rate, together with means for controlling pumping on the device in response to changes in current in the discharge device so as to maintain the pressure at an optimum value. While the invention has been illustrated and described as being employed with a neutron generator, it will be understood that the control system may also be used with other types of gaseous electric discharge devices, and that numerous substitutions, modifications and changes in the form and details of the system may be made without departure from the spirit and scope of the invention.

What is claimed is:

Apparatus for generating neutrons comprising in combination a discharge tube having an envelope and a pair of opposed electrodes sealed therein, a high voltage transformer having primary and secondary windings, a source of alternating current connected to said primary winding, means connecting said secondary winding to said opposed electrodes for establishing a neutron generating discharge therebetween, a reservoir of gaseous heavy isotope of hydrogen communicating with said envelope and arranged to continuously leak gas into said envelope, a vacuum pump connected to said envelope through a gas passage, an electromagnetic valve connected in said gas passage to open and close said passage, current sensitive means connected in series with said primary winding for deriving a signal proportional to the neutron generating discharge current flowing between said electrodes, a relay, means for adjustably applying said signal to said relay for actuation thereof when said signal exceeds a predetermined value, said relay when actuated being effective to open said electromagnetic valve to permit pumping on said envelope to reduce the pressure of said heavy hydrogen isotope in said discharge tube thereby decreasing said signal to deactuate said relay and terminate said pumping, whereby said relay, said electromagnetic valve and said pump control the gas pressure between said electrodes to optimize the neutron producing discharge voltage between said electrodes.

References Cited in the file of this patent

UNITED STATES PATENTS

| | | |
|---|---|---|
| 1,008,728 | Moore | Nov. 14, 1911 |
| 1,566,279 | King | Dec. 22, 1925 |
| 2,009,218 | Baumhaver et al. | July 23, 1935 |
| 2,211,668 | Penning | Jan. 7, 1938 |
| 2,240,914 | Schutze | May 6, 1941 |
| 2,602,898 | Inghram et al. | July 8, 1952 |
| 2,769,096 | Frey | Oct. 30, 1956 |

FOREIGN PATENTS

| | | |
|---|---|---|
| 724,441 | Great Britain | Feb. 23, 1955 |